United States Patent
Murakami et al.

(10) Patent No.: US 7,228,055 B2
(45) Date of Patent: Jun. 5, 2007

(54) RECORDING APPARATUS, VIDEO CAMERA AND COMPUTER PROGRAM

(75) Inventors: Tomokazu Murakami, Tokyo (JP); Masahiro Kageyama, Hino (JP); Nobuhiro Sekimoto, Kokubunji (JP); Hisao Tanabe, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 1035 days.

(21) Appl. No.: 10/331,658

(22) Filed: Dec. 31, 2002

(65) Prior Publication Data
US 2004/0052275 A1    Mar. 18, 2004

(30) Foreign Application Priority Data
Sep. 13, 2002    (JP) .............................. 2002-267556

(51) Int. Cl.
H04N 5/76    (2006.01)
H04N 7/00    (2006.01)
H04N 5/93    (2006.01)
G00B 27/00   (2006.01)

(52) U.S. Cl. .............................. 386/52; 386/95; 386/98
(58) Field of Classification Search ................. 386/96, 386/98; 348/423.1
See application file for complete search history.

(56) References Cited

U.S. PATENT DOCUMENTS 6,360,057 B1 * 3/2002 Tsumagari et al. ............ 386/95
6,445,877 B1 * 9/2002 Okada et al. ................. 386/95
6,512,884 B1 * 1/2003 Sawada ........................ 386/96
2002/0018645 A1   2/2002 Nakamatsu

FOREIGN PATENT DOCUMENTS

| JP | 9-37204 A | 2/1997 |
| JP | 11-112944 A | 4/1999 |
| JP | 2001-359051 | 12/2001 |

* cited by examiner

Primary Examiner—Thai Tran
Assistant Examiner—Nigar Chowdhury
(74) Attorney, Agent, or Firm—Antonelli, Terry, Stout & Kraus, LLP.

(57) ABSTRACT

To connect two divided and multiplexed streams seamlessly, a gap between video and audio playback times has to be adjusted. And, to make this adjustment, every conventional method has been required to process mass data by extracting and re-encoding the elementary streams and re-arranging the data, so that the data cannot be handled by any video cameras.

However, the present invention has successfully solved the above conventional problems as follows. An audio packet disposed at the start of a following stream to be connected is replaced with a null packet if its playback start time precedes that of the video packet. Then, soundless audio packets are added at the end of the preceding stream, thereby eliminating the gap between video and audio playback times in both of the streams to realize the required seamless connection.

9 Claims, 7 Drawing Sheets

RECORDING APPARATUS, VIDEO CAMERA AND COMPUTER PROGRAM

CROSS-REFERENCE TO RELATED APPLICATION

This application is related to U.S. application Ser. No. 09/942,717 filed on Aug. 31, 2001, the disclosure of which is hereby incorporated by reference.

BACKGROUND OF THE INVENTION

1. Field of the Invention

The present invention relates to media and apparatuses for recording data streams, as well as a program that describes a method for recording data streams. More particularly, the present invention relates to media and apparatuses for recording multi-media data streams conforming to the MPEG, as well as programs that describe the methods for recording data streams.

2. Description of the Related Art

In order to record and transmit mass digital data converted from video and audio information, there have been proposed various methods such as the MPEG (Moving Picture Experts Group) and they have grown into such international standard encoding methods as the ISO/IEC 11172 standard and the ISO/IEC 13818 standard. Those methods have been employed widely for digital satellite broadcasting and DVDs and now very familiar even to ordinary people.

In addition, along with the progress and spread of digital video cameras, as well the appearance of such mass data recording media as DVD-RAM, DVD-RW, etc. on the market in recent years, the users come to expect strongly to cope with the processings of video and audio data recorded as digital data. Many researches and developments have been promoted to search, analyze, and edit such digital data to meet the expectation.

The ISO/IEC 13818 standard (hereinafter, to be described as the MEPG-2 standard) is one of the methods and consists of an ISO/IEC 13818-1 standard (hereinafter, to be described as the system standard), an ISO/IEC 13818-2 standard (hereinafter, to be described as the video standard), and an ISO/IEC 13818-3 standard (hereinafter, to be described as the audio standard). The system standard is employed to multiplex streams conforming to the video standard and the audio standard. A stream means a sequence of encoded video or audio data. Video data is encoded in pictures. When in editing, however, video data is handled in groups, each consisting of a plurality of pictures (hereinafter, to be described as the GOP). The GOP is a unit of estimating a movement compensation. Audio data is encoded in units of audio accesses (hereinafter, to be described as the AAU). Such encoded data is referred to as an elementary stream. Generally, video elementary streams and audio elementary streams are set in different packets and multiplexed independently of each other. A Transport Stream (TS) or the like is used to multiplex such the video and audio data. A multiplexed data stream is edited for each unit of consecutive packets between a packet that includes the start of a GOP and a packet that includes the start of the next GOP (hereinafter, to be described as the VOBU).

The MPEG-2 standard defines that an elementary stream conforming to both video and audio standards is divided into proper long blocks and a header is added to each of the blocks to be grouped as a packet. And, data is multiplexed in such packets.

Figure 2:
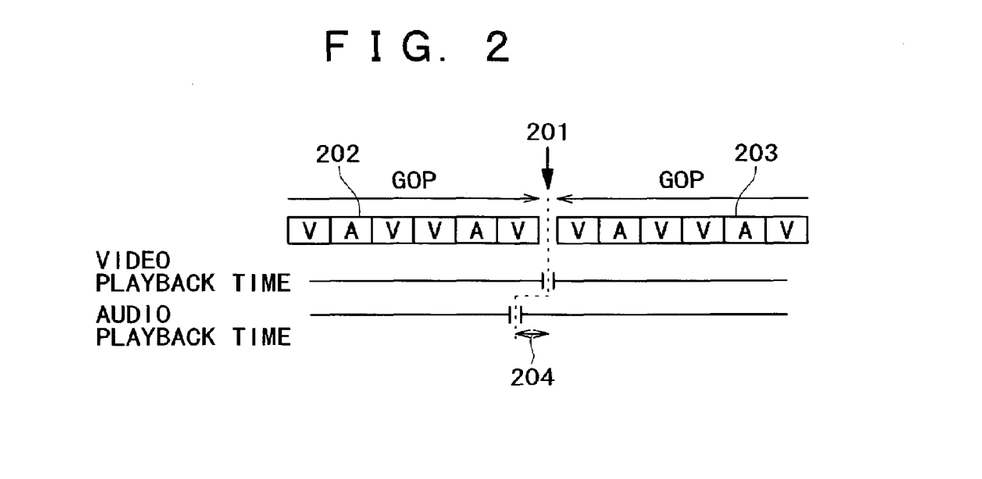
FIG. 2 is a chart for describing how multiplexed streams are edited.

On the other hand, when a multiplexed stream is resolved into video data and audio data and played back at the decoding side, video data and audio data of the stream are stored in different buffers. Video data and audio data are thus multiplexed at different timings, properly to each of them. In addition, because video data is larger than audio data in size in the same unit of playback time, the video data, when it is decoded, needs a larger buffer. Consequently, video packets are multiplexed earlier than audio packets in each multiplexed stream. FIG. 2 shows how a multiplexed stream is edited. In the case where a stream is divided at a cutting point (201), that is, a VOBU boundary, the preceding stream (202) comes to have a video playback end time, which is earlier than the audio playback end time while the following stream (203) comes to have a video playback start time, which is earlier than the audio playback start time. This is why a gap (204) occurs between those video and audio playback times.

For example, it takes thought here for a case in which a preceding stream created as described above is connected to the following stream created at another place and the connected streams are edited so that both video and audio data in the streams are played back smoothly non-stop. Such the nonstop playback is referred to as seamless playback. And, editing streams so as to play back them seamlessly is referred to as seamless connection. The MPEG-2 standard regulates conditions that both video and audio playback end times at the end of a preceding stream and both video, as well as audio playback start times at the start of the following stream must be synchronized respectively (at least, within a predetermined tolerance of one AAU playback time) to realize such the seamless connection. However, two streams created as described above come to generate a gap between the video and audio playback times and the gap disables such the seamless connection without employing some measures to eliminate the gap.

Conventionally, to realize such the seamless connection, packet headers are removed from both preceding and following streams to obtain elementary streams, then video and audio data are decoded and their playback times are adjusted to eliminate the gap between video and audio playback times. Then, the data is encoded and recorded as packets or recorded as another stream.

The JP-A No. 112944/1999 discloses a method for adjusting an audio gap between a stream broadcast from a key station and another stream held in a relay station. According to this method, at first, both video and audio elementary streams are taken out from the received transport stream, then the playback time of the audio data held in the relay station is compared with that of the received audio data. If a gap occurs between those playback times, the gap is eliminated with use of soundless audio access unit(s) and the stream is transformed into packets, which are then multiplexed to create a transport stream. This method, however, just processes elementary streams and connects a stream to each received stream, then records and transmits the connected streams as a new stream.

On the other hand, the JP-A No. 37204/1996 discloses a method for editing data in elementary streams. This method, as well as the above-described method, however, have to process a huge amount of data, since they are always required to take out elementary streams from packets, decide/re-encode streams, as well as re-arrange data files recorded on a recording medium after some data in such a file is processed. This is why it has been very difficult for those methods, as well as other conventional methods to realize the above-described seamless connection in such small devices as video cameras.

Under such circumstances, it is an object of the present invention to provide a method for realizing such the seamless connection only by eliminating a gap of the playback time between video data and audio data in a stream in a simple way; the method has successfully eliminated processings for removing packet headers from a multiplexed stream to take out elementary streams and decode/re-encode elementary streams and re-arrange data files recorded on a recording medium. It is also another object of the present invention to provide a recording medium for recording multiplexed streams created according to the above method, a program that describes the method for creating data packets, a data recording apparatus, and a video camera.

SUMMARY OF THE INVENTION

In order to achieve the above objects, the present invention uses a recording apparatus that comprises an input unit for inputting a data stream in which a video packet and an audio packet are multiplexed; dividing means for dividing the data stream into first and second streams; means for synchronizing the playback end time between the video packet and the audio packet that are multiplexed in the first data stream; means for synchronizing the playback start time between the video packet and the audio packet that are multiplexed in the second data stream; means for connecting the end of the data stream in which both video and audio playback end times are synchronized to the start of the data stream in which both video and audio playback start times are synchronized to create a new data stream; and recording means for recording the new data stream on a recording medium.

Furthermore, the present invention also uses an apparatus for rewriting only modified portions of the first and second data streams recorded on the recording medium instead of the means for connecting the first and second data streams to each other and the means for recording the newly created data stream.

DETAILED DESCRIPTION OF THE PREFERRED EMBODIMENT

Hereunder, an embodiment of the present invention will be described with reference to the accompanying drawings.

Figure 1:
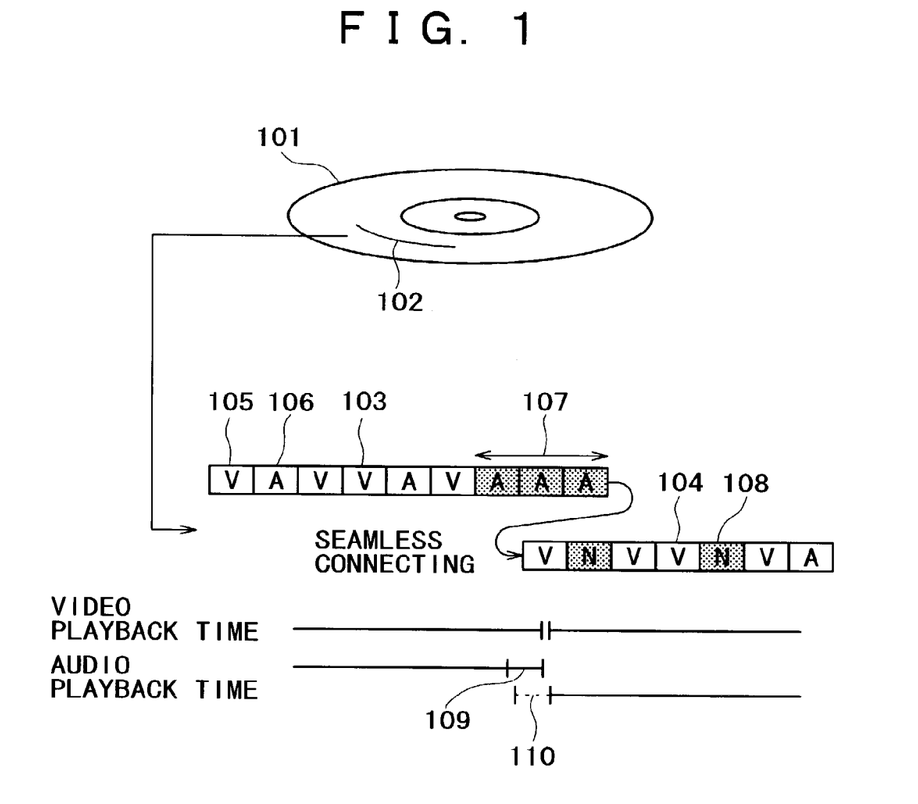
FIG. 1 is a chart for describing a multiplexed stream in an embodiment of the present invention.

FIG. 1 shows a multiplexed stream created in the embodiment of the present invention. Hereunder, the features of the multiplexed stream will be described.

At first, a description will be made for the features of a data stream (102) to be recorded on a data recording medium (101) according to the present invention with reference to FIG. 1. This data stream is a multiplexed stream consisting of packets (104) and (105) that are disposed consecutively. A stream (103) and another stream (104) are created by dividing and editing some streams recorded separately, then by means of a simple seamless connection respectively. It is assumed here that each multiplexed stream consists of some video packets (105) for storing video data and some audio packets (106) for storing audio data.

The first packet of the following stream (104) is an audio packet before the seamless connection is done, then it is replaced with another packet that is not recognized as an audio packet when the stream is decoded. This packet, for example, may be a null packet obtained by adding the source packet header to a null TS packet, which is an invalid packet defined by the MPEG-2 standard. The packet may also be a system information packet. The use of such a null packet makes it possible to delete surplus audio data (110) of which playback start time is earlier than that of video data in the following stream. Consequently, both video and audio playback start times are adjusted to be synchronized.

To the end of the preceding stream (103) is added a packet stream consisting of soundless audio packets (107) or another packet stream consisting of audio packets replaced in the following stream (104). While packets to be added here should preferably be soundless audio packets, normal audio packets may also be added to realize the seamless connection of the present invention. Consequently, the soundless audio or replaced audio packets fill the gap (109) generated because of insufficient audio packets, since the audio playback end time is earlier than the video playback end time, thereby both video and audio playback end times are adjusted to be synchronized. In the case where an audio gap in the preceding stream cannot be filled because of insufficient audio packets replaced in the following stream, the gap may be filled with soundless audio packets added to the stream.

As described above, it is very easy to process multiplexed streams processed according to the present invention, since any of the multiplexed streams can be processed only by adding and replacing packets therein without decomposing any packet. Such a multiplexed stream can be modified in the minimum scale on the recording medium. And, such a multiplexed stream in which packets are connected seamlessly always arrives in the decoder so that video and audio data are never broken off therein. Video/audio data is thus played back smoothly nonstop even at editing points.

Figure 4:
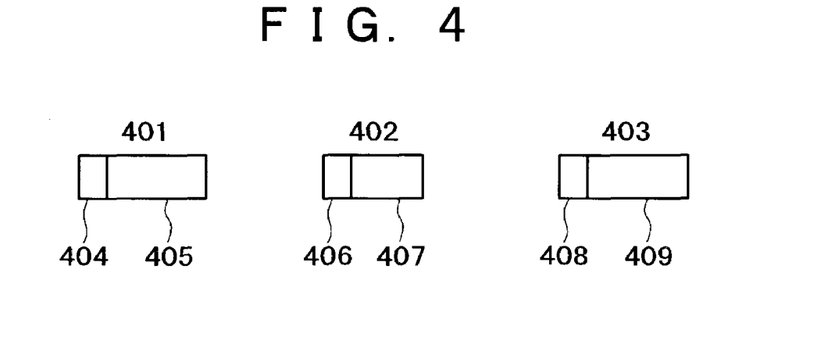
FIG. 4 consists of charts for describing packets used in the embodiment of the present invention.

FIG. 4 shows an example of the packets employed in the present invention. Hereunder, the features of the packets will be described.

The present invention uses packets, each storing playback time data. Generally, each of the packets consists of a header and a payload. The header includes a flag that denotes the feature of the data stored in the payload. At this time, the flag may denote the packet arrival time and/or data playback time. The payload stores video and audio elementary streams. In this case, the payload may store packets that include elementary streams respectively. For example, the payload may store a source packet (401), a TS packet (402) defined by the MPEG-2 standard, and a pack (403).

The source packet (401) consists of a packet header (404) and a TS packet (405). The packet header (404) stores time information for specifying a timing of sending the TS packet (405) to a decoder and/or network, as well as copy right information used for copying the packet. The TS packet (405) will be described later.

A TS packet (402/405) is used to send a transport stream defined by the MPEG-2. The TS packet consists of a header (406) and a payload (407). The header (406) stores information for denoting a packet type, information for obtaining synchronization, and various flags for denoting priority level, etc. The header (406) also stores a PCR for denoting a packet processing timing. The payload (407) stores video data and audio data that are divided into blocks respectively. Generally, a compressed and encoded video/audio elementary stream is divided into PES packets, and further into fixed-long blocks.

The pack (403) is a packet used to send a program stream defined by the MPEG-2. The pack (403) consists of a pack header (408) and a payload (409).

The pack header (408) stores an SCR for denoting a pack processing timing, a flag for denoting the pack attribute, etc. The payload (409) stores video data and audio data. Generally, the elementary stream of the video data/audio data stored in the payload is divided into PES packets.

Figure 5:
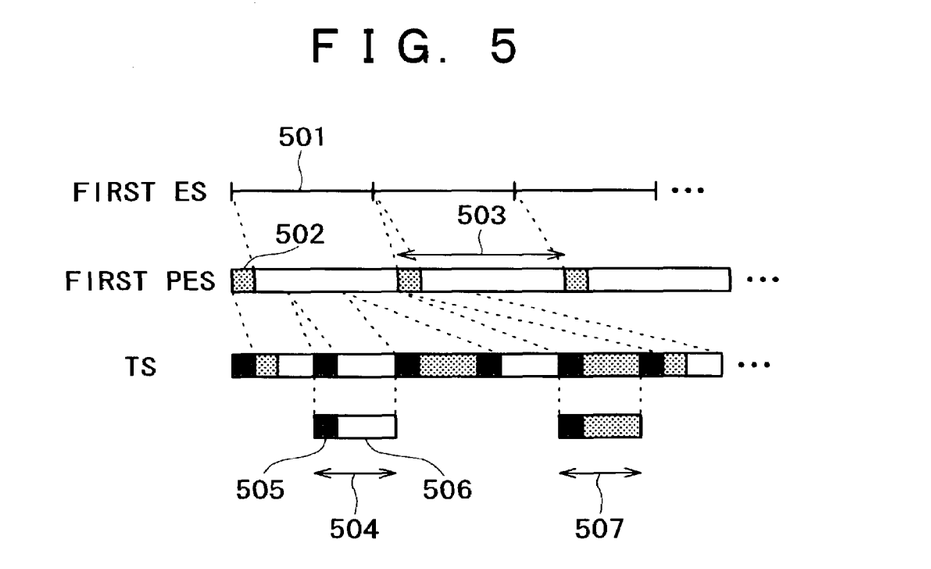
FIG. 5 is a structure of a multiplexed stream in the embodiment of the present invention.

Next, a description will be made for a relationship among the streams employed in the present invention, that is, an elementary stream (ES), a packetized elementary stream (PES), and a transport stream (TS), as well as the features with reference to FIG. 5.

The ES is a stream consisting of one type data just like the video ES or audio ES. Concretely, the ES consists of consecutive access units (501). An access unit denotes a unit of playback ES data continued for a certain time. An access unit of video data corresponds to a picture while an access unit of audio data corresponds to an AAU. Each access unit has a certain playback time. Each video access unit is added data for denoting such information as the sequence header of the entire stream.

The PES is a stream for recording consecutive PES packets (503), each obtained by dividing an ES into proper long blocks and adding a PES header (502) to each of the blocks. The PES header stores a time stamp, which is a playback time of an access unit included in each PES packet. The time stamp is classified into a PTS (Presentation Time Stamp) for denoting a playback time and a DTS (Decoding Time Stamp) for denoting a decoding time. In the case of streams used in satellite broadcasting or the like, a PES header is added to each access unit to create a PES packet and a time stamp is added to every PES header.

The TS is a stream that stores consecutive TS packets, each obtained by dividing a PES into proper long data blocks and adding a TS packet header (505) to each of the data blocks. A TS packet (504) consists of a TS packet header (505) and a payload (506). Generally, a TS packet is fixed at a length of 188 bytes. The TS packet header stores a PCR, a PID (Packet Identifier), a flag for denoting whether or not the start of an access unit is set in the packet, a flag for denoting whether or not the start of the PES packet exists in-the packet. The payload (506) stores PES packets divided into blocks respectively.

Generally, a TS consists of a packet obtained from a plurality of ESs. For example, a packet (504) that includes the first ES and a TS packet (505) that includes the second ES are multiplexed into one TS packet. A source packet header can be added to such each TS packet to record a stream in which source packets are disposed consecutively.

Hereinafter, a description will be made for a source packet stream.

Figure 3:
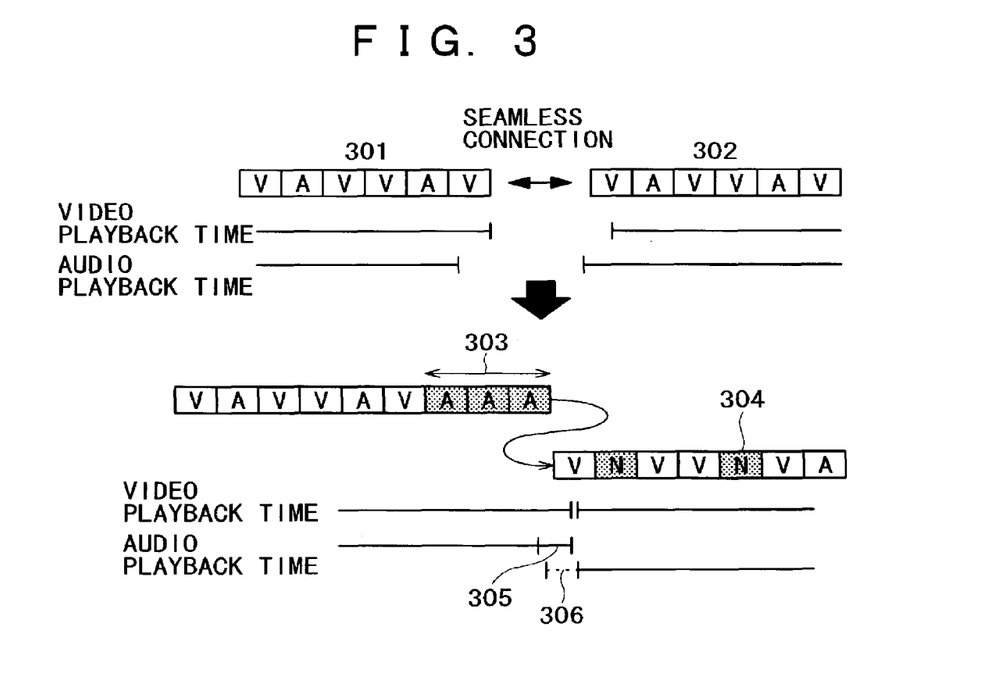
FIG. 3 is a chart for describing how to make a seamless connection in the embodiment of the present invention.

FIG. 3 shows a seamless processing method in the embodiment of the present invention. The seamless processing adjusts two streams so that they are played back smoothly. In each of the two streams, a plurality of types of packets, each including a playback time, are multiplexed. This is effective, for example, to create a digest clip to be played back seamlessly by taking out only the scenes of a batter from sandlot baseball video images with sounds, photographed by a video camera.

In the following description, it is assumed that two streams that are recorded separately are to be divided and edited at VOBU boundaries respectively It is also assumed here that each of the edited streams (301) and (302) is created by dividing a multiplexed stream at VOBU boundaries as described above and the audio playback end time is earlier than the video playback end time in the preceding stream (301) while the audio playback start time is earlier than the video playback start time in the following stream (302) due to a difference of the required buffer size between video data and audio data. In addition, those streams are assumed to have been recorded on different places on a recording medium, then the streams are connected seamlessly. The seamless connection mentioned here means playing back both video and audio data nonstop smoothly. The data in a seamlessly-connected stream is not always disposed consecutively. In this connection, the difference of the playback end time between video and audio is just required to be within one AAU playback time and the difference of the playback start time between video and audio is within one AAU playback time.

Therefore, at first, the difference of the playback start time between video and audio in the following stream (302) is adjusted as follows. The difference is calculated to identify the audio packets, each including the target AAU. Then, the audio packets that include the AAU respectively are replaced with null packets (304). Consequently, the audio data (306) to be played back earlier than the video data is deleted, so that the difference of playback start time between video and audio is reduced to within one AAU playback time. Generally, because one audio packet never includes a plurality of AAUs, the adjustment is completed just by such the packet replacement. There is no need to move the entire file to another place, since the size of the entire file remains the same at that time. When an audio packet is replaced with another, the audio packet to be removed may be held in a buffer so that it is used later for eliminating the playback end time between video and audio in the next preceding stream.

Next, the difference of the playback end time between video and audio in the preceding stream (301) is adjusted as follows. At first, the difference is calculated to decide how many audio packets to be used to eliminate the difference. Then, the decided number of soundless audio packets (303) are added to the end of the stream (301). Consequently, soundless audio data (305) is added to the audio data to be ended earlier than video data, thereby the difference of the playback end time between video and audio is reduced to a value within one AAU playback time. This processing just adds packets to the end of an existing stream, so that there is no need to move the entire file if the stream has a space enough to accept the added packets. The packets to be added may be soundless audio packets or audio packets held in the buffer after the processing of the following stream (302) described above.

Those processings may be done when the streams (301) and (302) are divided and edited to create a new stream or when those two streams are connected into one seamlessly. In any case, those processings make it possible to adjust the playback start time and the playback end time between video and audio to realize such the seamless connection.

Figure 6:
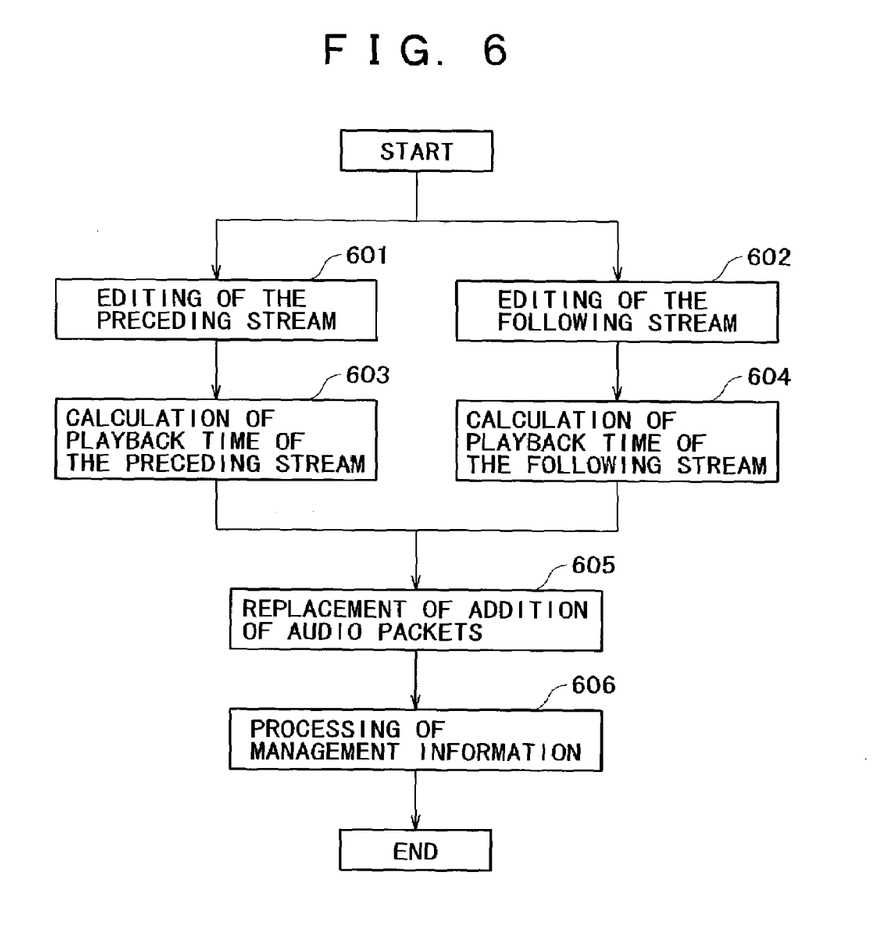
FIG. 6 is a flowchart for how to make a seamless connection in the embodiment of the present invention.

Next, a description will be made for a flowchart of the seamless connection of the present invention, as well as the features with reference to FIG. 6.

At first, the preceding stream is edited in step (601) to divide the target multiplexed stream and delete the portion of the stream beyond the target editing point, thereby creating a preceding stream in which the audio playback end time becomes earlier than the video playback end time. For example, in the case where the multiplexed stream is divided at a VOBU boundary, the audio playback end time becomes earlier than the video playback end time in the preceding stream. Control then goes to step (603).

On the other hand, in step (602), the following stream is edited to divide the target multiplexed stream and delete the portion of the stream before the target editing point, thereby creating a new following stream in which the audio playback start time becomes earlier than the video playback start time. For example, in the case where the multiplexed stream is divided at a VOBU boundary, the audio playback start time becomes earlier than the video playback start time in the following stream as described above. After this, control goes to step (604).

In step (603), the playback time of the preceding stream is calculated as follows. Concretely, the difference of the playback end time between video and audio at the end of the preceding stream is calculated to decide the number of packets used to eliminate this difference. The packets may be soundless audio packets. The details of the processing in this step will be described later. Control then goes to step (605).

In step (604), the playback start time of the following stream is calculated as follows. Concretely, the difference of the playback start time between video and audio at the start of the following stream is calculated to decide the number of packets used to eliminate this difference. The details of the processing in this step will be described later. Control then goes to step (605).

The processings in steps (601) and (603), as well as the processings in steps (602) and (604) may be done simultaneously in parallel or sequentially regardless of the order; it does not matter which of the two steps may be carried out first. The processings in steps (603) and (604) may be executed just after the processings in steps (601) and (602). If there is already a stream processed in steps (601) and (602), the stream may be subjected to the processings in steps (603) and (604).

In step (605), audio packet replacement is done in or necessary audio packets are added to the subject stream as follows. The audio packet positioned around the start of the following stream is replaced with another according to the information found in step (604), then necessary number of packets are added to the preceding stream according to the information found in step (603). The replacing packets may be null packets and the packets to be added may be soundless audio packets. The details of the processing in this step will be described later. Control then goes to the next step (606).

In step (606), the management information is processed as follows. The management information is used to manage multiplexed stream related information and stored in a file stored in the system memory or recording medium. If each of the preceding stream and the following stream includes a management information file on a recording medium, the management information file comes to store such items as the number of packets in the stream, both video and audio playback start times and playback end times, start and end addresses of the stream, video resolution, bit rate, audio sampling rate, bit rate, etc. And, because such the information as video and audio playback start times and playback end times, start and end addresses of the stream changes according to the result of the addition/replacement of the audio packets as described above, the information must be kept updated. The management information also includes information for denoting whether or not those streams are connected seamlessly, which streams are to be connected seamlessly and played back when the seamless connection is allowed. After a seamless connection, those information items stored in the management information is updated, thereby the streams are played back seamlessly. This completes the description of the seamless connection.

Figure 7:
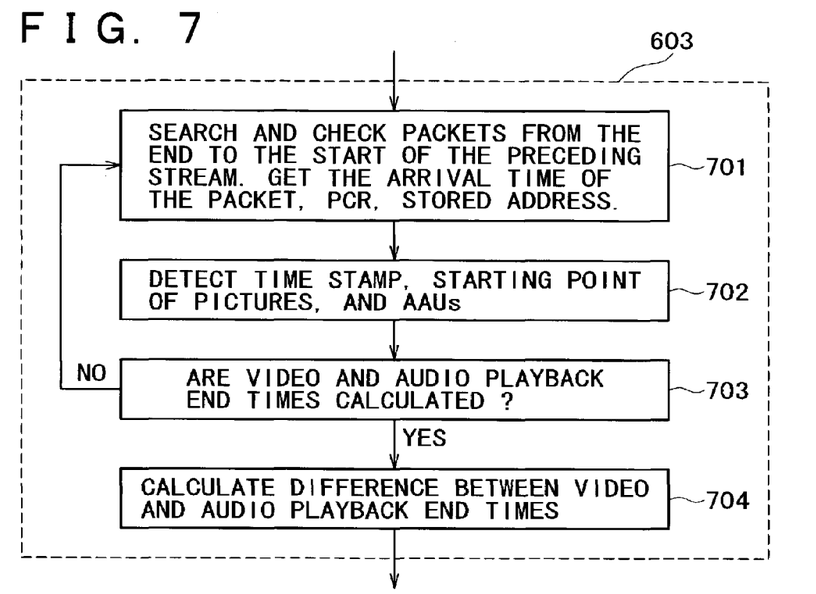
FIG. 7 is a detailed flowchart for how to make a seamless connection in the embodiment of the present invention.

FIG. 7 shows details of how the playback time of a preceding stream is calculated. This processing is detailed one executed in step (603). This step (603) calculates a difference of the playback end time between video and audio in a preceding stream.

In step (701), packets are searched and checked in the direction from the end to the start of the preceding stream to obtain the header information, etc. For example, when the stream is a source packet stream, the fixed length of which header is 4 bytes and the fixed length of which TS packet is 188 bytes, the packet check may be done in units of 192 bytes from the end to the start of the stream to obtain the packet arrival times, the PCRs, and the PIDs from the source packet header and the TS packet header. The PCR is information for denoting the time of the packet arrival in the decoder buffer. The PID is information for identifying a packet type. The PID distinguishes among a video packet, an audio packet, or another type packet. To distinguish among the packets according to the PID, however, it is required to obtain the PSI (Program Specific Information) beforehand. The PSI is recorded in a PSI packet that holds the PID or management information in the stream. The PSI can also be obtained by identifying the PSI packet during the packet searching as described above or by using the PSI packet set as the start of the stream. The PSI is a generic word of the information that describes features of each packet and each elementary stream included in a multiplexed stream. The PSI manages streams with reference to both of a PAT (Program Association Table) and a PMT (Program Map Table). The PAT describes information related to a program that is a collection of video and audio data included in each multiplexed stream. The PMT describes the contents of each program and stores information of video and audio packets. The PMT describes each video packet PID and each audio packet PID used respectively to distinguish between video packet and audio packet. Control then goes to step (702).

In step (702), the video or audio playback time information is obtained. For example, the time stamp, the starting point of pictures, and the AAUs are detected. In the preceding step (701), it is checked that the packet is a video or audio packet and the header information is obtained. If the flag of the TS packet denotes inclusion of the start of the PES packet, the time stamp is obtained from the PES packet header. The time stamp denotes the playback time of each access unit to appear one after another in the PES packet. If the flag of the TS packet denotes inclusion of the start of an access unit, the access units in the packet are checked to count the number of access units therein. For a video packet, the picture type and the playback order information are obtained beforehand. And, according to these information items, control goes to the next step (703) to decide the playback end time.

In step (703), the video and audio playback end times are calculated according to the playback time information of each of the video and the audio.

Next, how to decide an audio playback end time will be described. It is assumed here that each PES packet includes one access unit as described above and streams are multiplexed into a source packet. In this connection, the source packet that includes the start of the last access unit (AAU) also includes the start of a PES packet and its time stamp. Concretely, to find a playback end time, at first packets are checked in the direction from the end to the start of the stream to find the packets, each of which has a flag for denoting the inclusion of the first PES packet in the TS packet header. Then, the time stamp is taken out from the PES packet and the playback time of one access unit is added to the time stamp to obtain the playback end time. On the other hand, there is also a stream multiplexed so as to include a plurality of AAUs in one PES packet. In this case, packets in the stream are checked in the direction from the end to the start by counting the number of packets, each having a flag for denoting the inclusion of the start of an access unit in the TS packet header, thereby finding packets that includes the start of a PES header respectively. The playback end time takes a value of (the playback time of the access units up to the end of the stream+ the time stamp obtained from this PES header).

Next, how to decide a video playback end time will be described. A video playback end time is obtained by adding the playback time of a picture to the playback time of the last picture to be displayed. For MPEG-2 video data, the order of pictures stored in a stream differs from the playback order. This is why the last access unit is not always the last picture to be played back. In other words, for video data, the last picture to be played back is decided by considering both picture type and picture playback order. For example, pictures are checked in the direction from the end to the start of the stream to find the start of the last I picture or P picture. Then, the playback time of the last I picture or P picture is obtained from the time stamp of the PES packet that includes the start of the last I picture or P picture and adds the picture playback time to the obtained playback time so as to obtain the target playback end time.

When both video and audio playback end times are obtained, control goes to step (704). When not, control goes back to step (701) to repeat the processings in the above steps until the end times are obtained.

In step (704), the difference of the playback end time between video and audio is calculated. This completes the calculation of the playback start and end times of the preceding stream.

Figure 8:
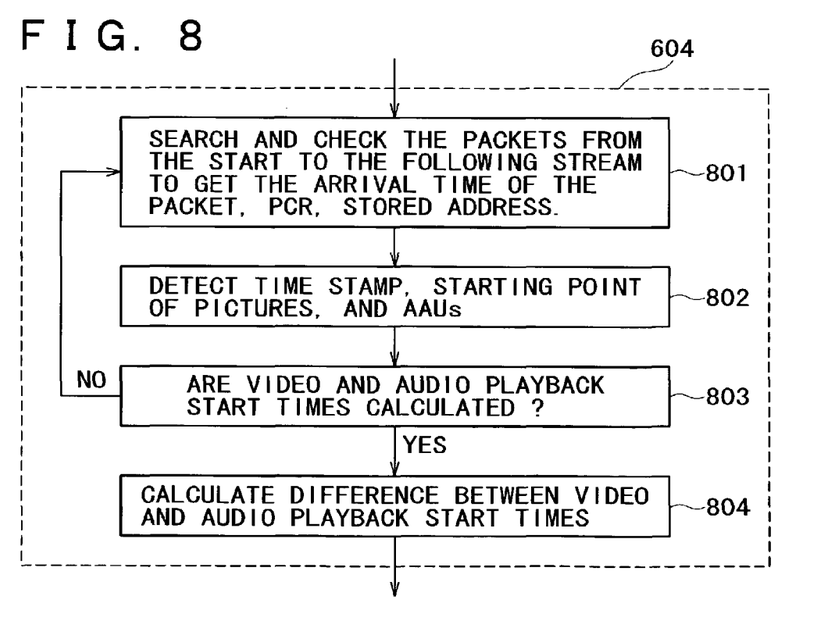
FIG. 8 is still another detailed flowchart for how to make a seamless connection in the embodiment of the present invention.

FIG. 8 shows a flowchart of how to calculate a playback time of a following stream. This flowchart shows details of the processing in step (604). In this flowchart, a difference of the playback start time between video and audio in a following stream is calculated as follows.

In step (801), packets are searched and checked in the direction from the end to the start of the target following stream to obtain the header information, etc. from each packet. Then, the packet arrival time, the PCR, and the PID are obtained from the source packet header and the TS packet. The PID distinguishes among a video packet, an audio packet, and another type packet as described above. Control then goes to the next step (802).

In step (802), the video or audio playback time information is obtained. For example, the time stamp, the picture, and the AAU are detected just like in step (702). Then, the video and audio playback start times are decided in step (803) according to the obtained information.

In step (803), the playback start times of both video and audio are calculated and decided according to their playback time information respectively.

At first, how to decide an audio playback start time will be described. In a stream in which one PES packet includes one access unit (AAU), the first PES packet is found just like in the above case to obtain the time stamp. The time stamp denotes the playback start time of the stream. On the other hand, in a stream in which one PES packet includes a plurality of AAUs, the number of AAUs is counted until the first time stamp is obtained just like in the above case, then the playback time is subtracted from the first time stamp by the number of AAUs to obtain the playback start time of the stream.

Next, how to decide a video playback start time will be described. A video playback start time is the playback time of the first picture to be displayed. As described above, for MPEG-2 video data, the order of pictures stored in a stream differs from the playback order, so that the first access unit is not always the first picture to be played back. In a stream in which one PES packet includes one access unit (AAU), the playback priority of each picture is compared with others to decide the time stamp of the picture having the least value as the playback start time.

When both video and audio playback start times are obtained, control goes to step (804). When not, control goes back to step (801) to repeat the processings in the subsequent steps until the start times are obtained. When both video and audio playback start times are obtained, the addresses of both video and audio packets, each of which includes the first access unit or the number of packets from the first one, may be held in the buffer beforehand.

In step (804), the difference of the playback start time between video and audio is calculated. This completes the calculation of both video and audio playback times in the following stream.

Figure 9:
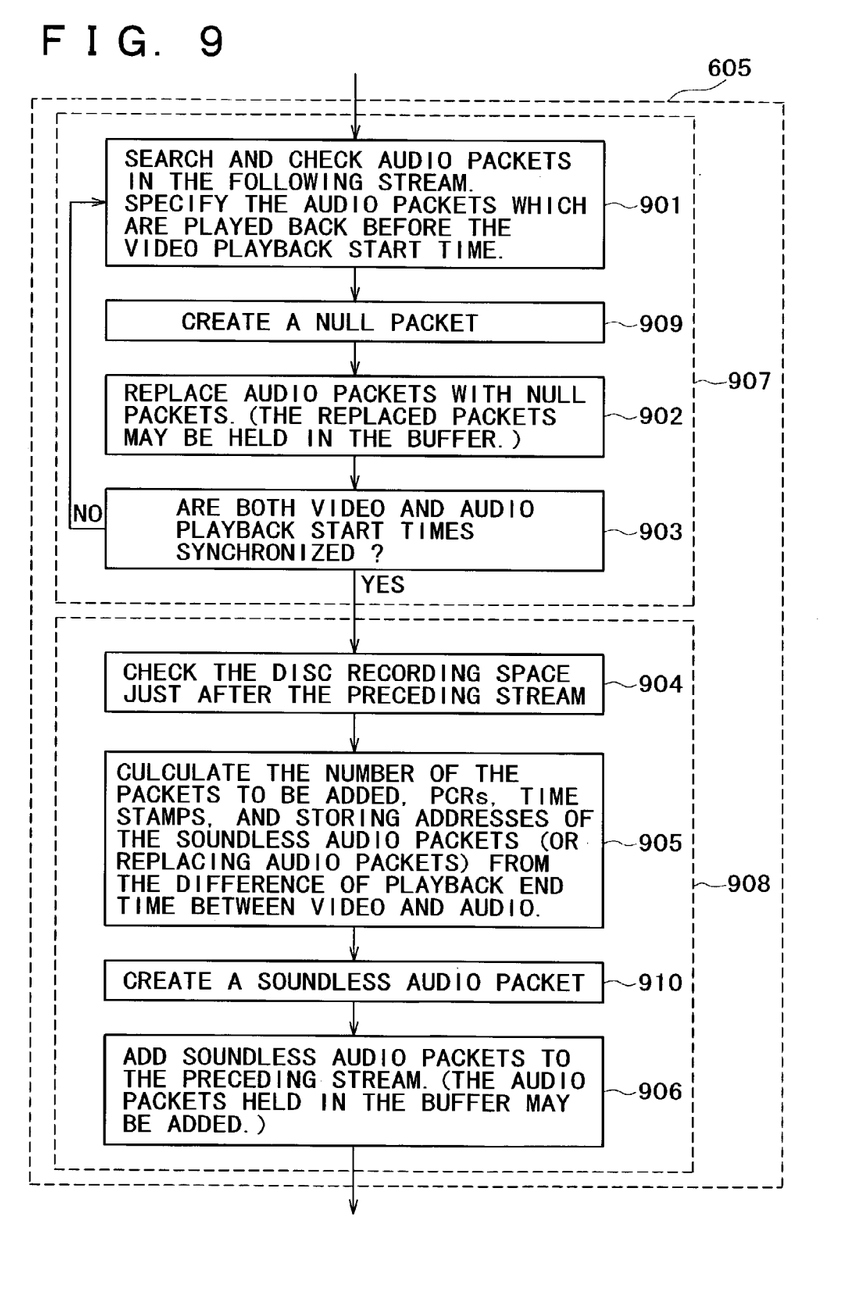
FIG. 9 is still another detailed flowchart for how to make a seamless connection in the embodiment of the present invention.

FIG. 9 shows a flowchart for replacing and adding audio packets. This flowchart shows the details of the processing in step (605). Concretely, the step (605) is divided into a step (907) for replacing the first audio packet in a following stream with another and a step (908) for adding audio packets to the preceding stream. The processings in those steps may be executed simultaneously in parallel or sequentially in any order.

In step (901), audio packets are searched in the following stream to identify audio packets, each having a playback start time earlier than any of the video playback start times according to the information obtained in the above step (604), for example, according to the audio playback start time, the first packet position, etc. Control then goes to the next step (909).

In step (909), a packet is created so that the packet has a length equivalent to the difference of the playback start time between video and audio in the following stream. This packet may be a null packet or packet that includes an invalid PSI. Control then goes to step (902).

In step (902), audio packets, each having a playback time earlier than the target video playback start time, are replaced with others. The new packets may be null packets or packets that include an invalid PSI respectively. When audio packets are replaced with null packets, all audio data that precede video data are deleted, thereby the difference of the playback start time between video and audio is reduced to a value within one AAU time. The replaced audio packets may be discarded or held in the buffer so as to be added later to the audio data in step (908). If the start of an AAU exists among those audio packets, the data disposed before the start of the AAU may be discarded to create new audio packets with which the audio packets are to be replaced. An audio packet header value may be used as is in a null packet as the packet arrival time set in the source packet header. The header value may be updated through re-calculation so as not to cause a problem in the receiving side buffer. Control then goes to step (903).

In step (903), it is checked if both video and audio playback start times are synchronized. When they are synchronized, control goes to step (904). When not, control goes to step (901) to continue the packet replacement. This decision is done on the basis of the audio time stamp. This synchronization is decided when it is decided that an audio packet to be replaced next time includes the start of an AAU and this AAU playback time is larger than the value of (video playback start time−AAU playback time) or equal to the video playback start time or smaller than the value of (video playback start time+AAU playback time). Any of the above decision expressions or a plurality of those expressions may be used for the above decision.

In step (904), it is checked whether or not the preceding stream has a recording space enough to accept added audio packets. The recording space may not necessarily be positioned adjacently to the preceding stream while its position is decided with due regard to the drive buffer conditions so that data can be read continuously when in seamless playback. Control then goes to step (905).

In step (905), the number of audio packets to be added, the PCRs, the time stamps, and the data addresses are calculated from the difference of the playback end time between video and audio. Each of the soundless audio packets to be added includes a soundless AAU or part of a dummy AAU in itself. The decoder cannot play back any sound from soundless AAUs. And, the decoder ignores dummy AAUs. Although those soundless and dummy AAUs do not play back any sound, their playback times are specified. The playback time of each of such the AAUs is set equally to that of a normal AAU included in the preceding stream. Such the audio playback time may be decided for each soundless AAU just like a normal AAU even when the soundless AAU and the dummy AAU are set as PES packets and a time stamp is added to each of the PES packets. The number of soundless audio packets to be added is decided by the value of (the difference of the playback end time between video and audio/soundless AAU playback time). The fraction is rounded up or discarded. The PCR value and the packet arrival time are decided and stored as needed so as to connect the following stream to the preceding stream. The soundless audio packets described above may be replaced with the audio packets of the following stream, which are held in the buffer in step (902). In this connection, the new audio packets in the following stream can be played back with sounds. The number of audio packets to be added, etc. are found with use of the same method as that used for the soundless audio packets. If the number of the audio packets held in the buffer is not so many, soundless packets may be added. If too many audio packets are held in the buffer, some of them may be discarded. Control then goes to step (910).

In step (910), an audio packet is created so that the packet has a length equivalent to the difference of the playback end time between video and audio in the preceding stream. This audio packet may be a soundless audio packet. Control then goes to step (906).

In step (906), audio packets are added to the end of the preceding stream. The packets to be added may be soundless audio packets. Then, a recording space is secured on the subject recording medium checked in the above step, then the decided number of soundless audio packets are created and recorded in the space. The soundless audio packets may be replaced with the audio packets of the following stream, which are held in the buffer in step (902). A time stamp is recorded in each PES packet that includes the start of an AAU. The packet arrival time is set and recorded in the source packet header so as to dispose the packet adjacently to the end of the preceding stream. The PCR is also recorded in the TS packet as needed. This processing extends the audio playback end time of the preceding stream by the number of the added audio packets, thereby the playback end times becomes the same between video and audio.

Figure 10:
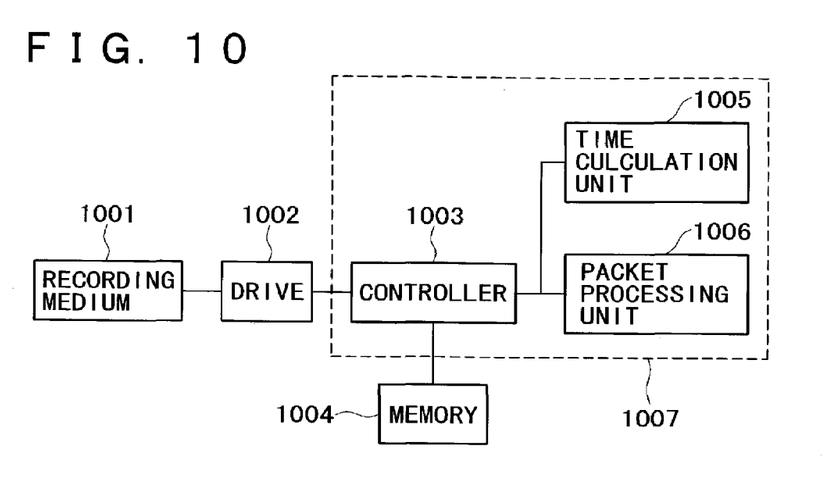
FIG. 10 is a block diagram of a data recording apparatus in the embodiment of the present invention.

FIG. 10 shows a block diagram of a data recording apparatus of the present invention. Next, the features of the recording apparatus will be described with reference to FIG. 10.

The data recording apparatus is configured by a data recording medium/disk (1001), a drive (1002), a controller (1003), a memory (1004), a time calculation unit (1005), and a packet processing unit (1006). The controller (1003), the time calculation unit (1005), and the packet processing unit (1006) are included in a processing unit (1007).

The recording medium (1001) is used to record streams and management information as described above. The recording medium may be any of a hard disk, a DVD-RAM, a DVD-RW, a DVD-R, a high density disk medium that uses a blue laser beam, a tape medium used for D-VHS, etc., and a semiconductor memory.

The drive (1002) can drive any of the data recording media as described above to read data therefrom. The drive (1002) may be any of disk drives and tape drives.

The controller (1003) manages input/output information so as to store streams and management information read from the recording medium (1001) through the drive (1002) in the memory (1004), transfers those information items to the calculation unit (1007), and stores calculation results in the memory (1004).

The memory (1004) stores streams, management information, calculation results, etc. The memory (1004) also functions as a buffer to output various calculated data as intermediate results and final results.

The time calculation unit (1005) calculates stream playback times according to the commands from the controller (1003). For example, the time calculation unit (1005) compares the time stamps between video and audio and calculates timings to output data to the buffer.

The packet processing unit (1006) analyzes contents of each packet to create a new packet according to the commands from the controller (1003). For example, the packet processing unit (1006) extracts such data as flags and time stamps from packets to transfer them to the time calculation unit (1005) and create and store soundless audio packets.

While each means is described with respect to each function so as to describe the data recording apparatus shown in FIG. 10, those means may be mounted collectively on a computer chip or realized by a software program.

Actually, those means are realized by any of the software programs installed in video cameras, video decks, personal computers.

Figure 11:
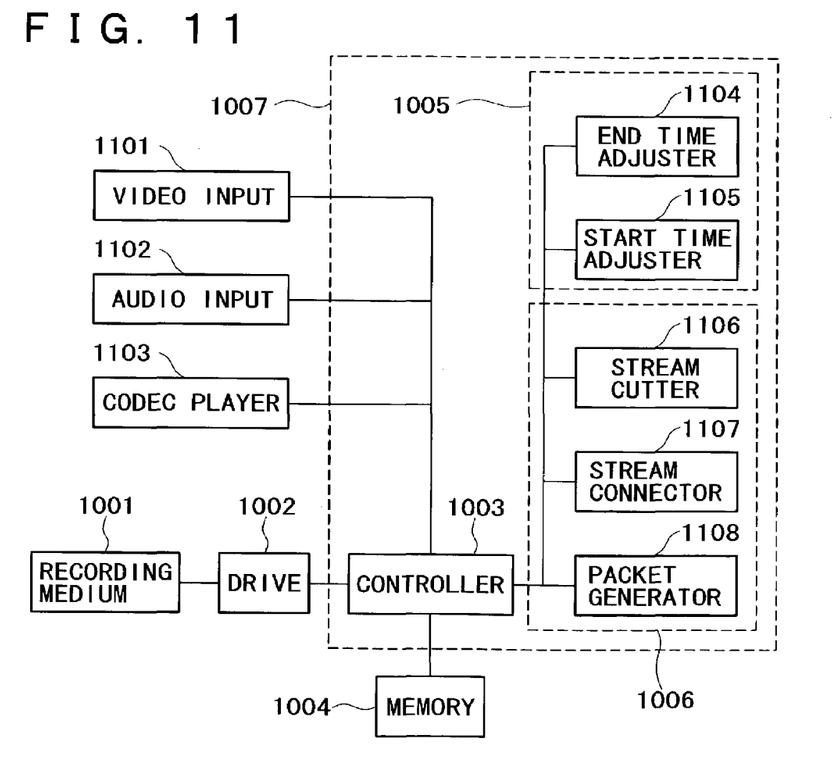
FIG. 11 is a block diagram of a video camera used in an embodiment of the present invention.

FIG. 11 shows a block diagram of a video camera used in the present invention and its features will be described below.

The recording medium (1001), the drive (1002), the controller (1003), and the memory (1004) used for the video camera are identical to those of the data recording apparatus described above. They are all used to edit data streams. The time calculation unit (1005) and the packet processing unit (1006) are divided here into an end time adjuster (1104), a start time adjuster (1105), a stream cutter (1106), a stream connector (1107), and a packet generator (1108) so as to be described more in detail. The video camera also includes a video input (1101), an audio input (1102), a codec player (1103) to realize the functions of the camera.

The video input (1101) inputs video images through a lens, a CCD, etc. For example, the video input (1101) converts video images to digital data according to the commands from the controller (1003) and transfers the data to the processing unit (1007).

The audio input (1102) inputs audio data through a microphone or the like by converting sounds to digital data according to the commands from the controller (1003) and transfers the data to the calculation unit (1007).

The codec player (1103) encodes and decodes both video and audio data. Concretely, the codex player (1103) compresses and encodes video and audio information inputted through the video input (1101) and the audio input (1102) conforming to the MPEG-2 or the like according to the commands from the controller (1003). Encoded streams are recorded on the recording medium (1001) according to the commands from the controller (1003). On the other hand, the codec player (1103) reads video/audio streams from the recording medium (1001) and decodes the data so that the data is played back as video images and sounds/voices. The played-back video and audio data may be output through the monitor or speaker built in the video camera or through an external monitor or speaker connected to the video camera.

The end time adjuster (1104) calculates the playback end time of each preceding stream when in editing. Especially, the end time adjuster (1104) calculates a difference of the playback end time between video and audio at the end of each preceding stream and the number of soundless audio packets used to eliminate the difference. This end time adjuster (1104) is provided to realize the processing in the previous step (603).

The start time adjuster (1105) calculates the playback start time of each following stream when in editing. Especially, the end time adjuster (1104) calculates a difference of the playback start time between video and audio at the start of each following stream and the number of audio packets to be replaced with others to eliminate the difference. This end time adjuster (1104) is provided to realize the processing in the previous step (604).

The stream cutter (1106) divides each multiplexed stream according to the commands from the controller (1003). Concretely, the stream cutter (1106) divides each multiplexed stream at a VOBU boundary to delete the stream beyond the editing point to create a preceding stream or following stream. The processings by this stream cutter (1106) are equivalent to the processings in steps (601) and (602).

The stream connector (1107) connects multiplexed streams to each other according to the commands from the controller (1003) on the basis of the information received from the end time adjuster (1104) and the start time adjuster (1105), as well as the packet data created by the packet generator (1108). The stream connector (1107) is equivalent to the means for replacing audio packets, adding audio packets, and adjusting management information in steps (605) and (606).

The packet generator (1108) creates null and soundless audio packets according to the commands from the controller (1003).

Although a description has been made for each means with respect to each function of the video camera shown in FIG. 11, those means may be mounted collectively on a computer chip or realized by a software program.

While the preferred form of the present invention has been described with respect to the MPEG-2 and ARIB standards, it is to be understood that modifications will be apparent to those skilled in the art without departing from the spirit of the invention.

According to the present invention, it is possible to create multiplexed streams so that, when two divided multiplexed (preceding and following) streams are to be connected so as to be played back nonstop, the gap of the playback time between video and audio is eliminated or reduced up to the tolerance easily only by adding and replacing some of packets in those two multiplexed streams, thereby enabling seamless playback of the streams; there is not need to decompose any packet nor re-arrange data files in the processing.

Furthermore, according to the present invention, there is no need to decode/encode data, so that the data processing amount is reduced more than when the encoding/decoding is required, thereby the calculation unit is not required of so high processing capability and the buffer capacity can be reduced.

Consequently, the present invention makes it easier to edit multiplexed streams in an advanced manner, simplify the editing device, and minimize the circuit in scale.

What is claimed is:

1. A recording apparatus, comprising:
   an input unit for inputting a data stream in which a video packet and an audio packet are multiplexed;
   a divider which divides said data stream into first and second data streams;
   a synchronizer which synchronizes playback end time between said video packet and said audio packet that are multiplexed in said first data stream;
   a synchronizer which synchronizes playback start time between said video packet and said audio packet that are multiplexed in said second data stream;
   a new data stream creator which connects the end of a data stream having said synchronized playback end time to the start of another data stream having said synchronized playback start time so as to create a new data stream; and
   a recorder which records said created new data stream on a recording medium;
   wherein said new data stream creator which creates a data stream having said synchronized playback end time includes:
   a generator which generates an audio packet having a length substantially equivalent to a difference of the playback end time between said video packet and said audio packet that are multiplexed in said first data stream; and
   an adder which adds said generated audio packet to the end of said first data stream.

2. The recording apparatus according to claim 1,
wherein said new data stream creator which creates a data stream having said synchronized playback start time includes:
a generator which generates a packet having a length substantially equivalent to a difference of the playback start time between said video packet and said audio packet that are multiplexed in said second data stream and not to be recognized as an audio packet when in playback; and
replacer which replaces an audio packet having a playback time preceding the playback start time of said video packet multiplexed in said data stream with said generated packet, said packet to be replaced being among those multiplexed in said second data stream.

3. The recording apparatus according to claim 2,
wherein said apparatus includes a buffer;
wherein said generator which generates an audio packet having a length substantially equivalent to a difference of the playback end time between said video packet and said audio packet that are multiplexed in said first data stream and said adder which adds a packet substantially equivalent to a difference of said generated playback end time are replaced with
a recorder which records said audio packet replaced by said replacer which replaces said audio packet multiplexed in said second data stream with another; and
an adder which adds an audio packet recorded in said buffer to the end of said first data stream.

4. The recording apparatus according to claim 2,
wherein said recorder which records said new data stream in said recording medium is replaced with a rewriter which rewrites a portion of a data stream recorded in said recording medium, said portion of said data stream being data modified from said two data streams or newly added data.

5. The recording apparatus according to claim 3,
wherein said recorder which records said new data stream in said recording medium is replaced with a rewriter which rewrites a portion of a data stream recorded in said recording medium, said portion of said data stream being data modified from said two data streams or newly added data.

6. A video camera comprising:
a photographing block for photographing a given video image; a voice input block for obtaining sounds and voices added to said image; a recording medium, and an editing block for editing a movie image consisting of said video image and said sounds and voices;
wherein said editing block includes a recording apparatus according to claim 1; and
wherein said input unit of said recording apparatus inputs a data stream in which said video image packet and said voiced audio packet are multiplexed.

7. A computer readable medium encoded with a computer program readable medium that enables a computer to execute a data editing method, comprising:

a step of inputting first and second data streams read from a recording medium, each of said first and second data streams including a video packet and an audio packet that are multiplexed therein;
a step of obtaining playback end times of said video packet and said audio packet that are multiplexed In said first data stream;
a step of calculating a difference of said playback end time between said video packet and said audio packet that are multiplexed in said first data stream;
a step of generating an audio packet for eliminating the difference of said playback end time;
a step of adding said generated audio packet to the end of said first data stream;
a step of obtaining playback start times of said video packet and said audio packet that are multiplexed in said second data stream;
a step of calculating a difference of said playback start time between said video packet and said audio packet that are multiplexed in said second data stream;
a step of generating a packet capable of eliminating the difference of said playback start time and not to be recognized as an audio packet when in playback;
a step of replacing an audio packet having a playback time preceding the playback start time of said video packet with said generated packet, said audio packet to be replaced being one of said audio packets multiplexed in said second data stream;
a step of connecting the end of said first data stream having said added packet to the start of said second data stream in which said audio packet is replaced with another to create a new data stream; and
a step of recording said generated new data stream on a recording medium.

8. A program for enabling a computer to execute said data editing method according to claim 7;
wherein said packet generated in said step for generating a packet having a length equivalent to a difference of the playback start time between a video packet and an audio packet included in said second data stream is a null packet.

9. A program for enabling a computer to execute said data editing method according to claim 7;
wherein said step of generating an audio packet having a length equivalent to a difference of said playback end time between said video packet and said audio packet that are multiplexed in said first data stream and said step of adding an audio packet having a length substantially equivalent to said generated playback end time difference are replaced with a step of recording an audio packet in a buffer, said audio packet being replaced in said step of replacing an audio packet multiplexed in said second data stream, and a step of adding an audio packet recorded in said buffer to the end of said first data stream.

* * * * *